(12) United States Patent
Penzimer

(10) Patent No.: US 6,651,588 B1
(45) Date of Patent: Nov. 25, 2003

(54) POWER SHAMPOOER FOR PETS

(76) Inventor: Theodore R. Penzimer, 560 Lakewood Framingdale Rd., Howell, NJ (US) 07731

(*) Notice: Subject to any disclaimer, the term of this patent is extended or adjusted under 35 U.S.C. 154(b) by 0 days.

(21) Appl. No.: 10/173,288

(22) Filed: Jun. 17, 2002

(51) Int. Cl.[7] .......................... A01K 13/00; A01K 29/00
(52) U.S. Cl. ....................................... 119/604; 119/665
(58) Field of Search ................................. 119/603, 604, 119/609, 651, 665

(56) References Cited

U.S. PATENT DOCUMENTS

| | | | |
|---|---|---|---|
| 1,879,915 A | | 9/1932 | Smoot |
| 3,778,848 A | | 12/1973 | Lyytinen |
| 4,741,289 A | | 5/1988 | Blose |
| 4,836,144 A | | 6/1989 | Cole |
| 5,193,487 A | | 3/1993 | Vogel |
| 5,448,966 A | | 9/1995 | McKinnon et al. |
| 5,632,231 A | | 5/1997 | Moore |
| 5,649,502 A | | 7/1997 | Frank |
| 5,662,069 A | * | 9/1997 | Smith .......................... 119/665 |
| 5,724,918 A | | 3/1998 | Navalon-Chicote |
| 5,738,044 A | * | 4/1998 | Gaylinn ....................... 119/665 |
| 5,769,029 A | | 6/1998 | Marshall |
| 5,785,004 A | * | 7/1998 | Hobbs .......................... 119/651 |
| 5,842,442 A | | 12/1998 | Marr |
| 5,845,604 A | | 12/1998 | Cucchi et al. |
| 6,029,610 A | | 2/2000 | Ramsey et al. |
| 6,345,592 B1 | * | 2/2002 | Hollis .......................... 119/604 |

OTHER PUBLICATIONS

Web pages of Hydrosurge, Inc. Animal Bathing Systems, HydroSurge®Deluxe, Power Bather, date unknown 18 pages.

Simer, Geyser II specification sheet, Model2305, date unknown.

* cited by examiner

Primary Examiner—Charles T. Jordan
Assistant Examiner—Elizabeth Shaw
(74) Attorney, Agent, or Firm—Caesar, Rivise, Bernstein, Cohen & Pokotilow, Ltd.

(57) ABSTRACT

A power shampooer for pets is provided which includes a submersible pump, a spray head, and a hose. The hose has a first end and a second end. The first end is sealingly connected to the spray head and the second end is sealingly connected to the pump. The pump has a bottom having a pump inlet. The pump may be placed on a generally flat surface can pump liquid from the flat surface via the pump inlet through the hose and through the spray head. The pump may have spacers to raise the pump inlet off of the generally flat surface and may include a plastic screen in combination with a stainless steel mesh screen to act as a filter to prevent clogging of the shampooer.

7 Claims, 2 Drawing Sheets

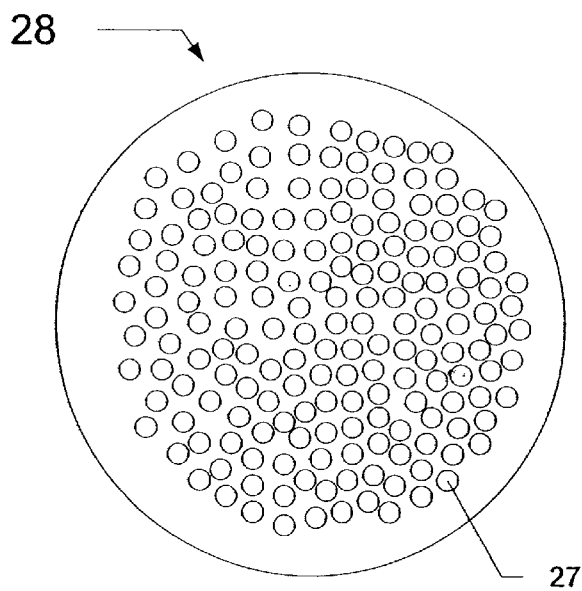
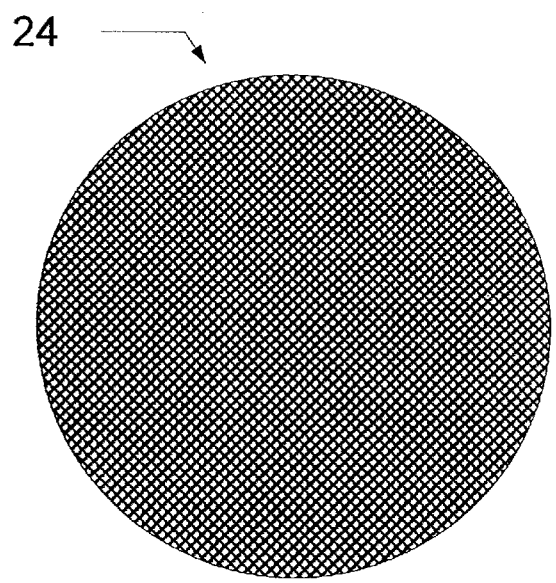
FIG. 2  FIG. 3
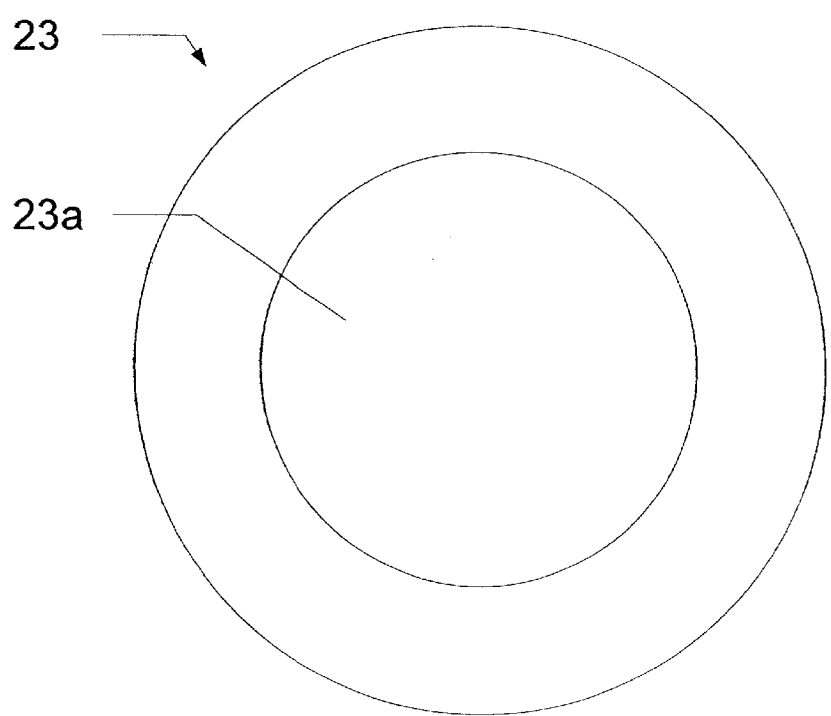
FIG. 4

POWER SHAMPOOER FOR PETS

BACKGROUND OF THE INVENTION

The present invention relates to a system for washing animals. More particularly, the present invention relates to a power shampooer system for animals that is of particularly high efficiency.

Animals, both large and small, are conventionally washed by hand. Washing by hand requires manual application of water and of cleaning agents. Hand washing is a highly labor intensive operation. It is difficult to work the shampoo into the animal's hair and skin. Substantial hand massaging is necessary for the purpose of cleaning and working of the cleaning agents into the coat and skin and for releasing loose hair and dirt. Frequently, water is available only at low pressures. The result is that hand washing is slow, laborious, and does not produce uniform results, since neither adequate washing nor thorough rinsing is assured.

Various apparatus for washing of animals are also known. These apparatus obviate, to varying degrees, the necessity for manual labor in washing an animal. Although some animal bathing apparatus known in the art provide for water circulation, the presently known animal bathing systems typically use water in a once-through basis. Such systems are wasteful of water and cleaning and conditioning agents, are energy inefficient, and generally require application of cleaning and conditioning agents by hand.

U.S. Pat. No. 6,029,610 (Ramsey et al.) discloses a method for washing animals wherein a series of animals passes through a race having a means to apply a pressurized spray. A cleaning fluid is supplied from a reservoir via a centrifugal pump to a supply line connected to a valve and to a solenoid operated valve before being supplied to spray bars.

U.S. Pat. No. 5,845,604 (Cucchi et al.) discloses a basin for washing and drying pets. FIGS. 18 and 19 appear to depict a pump (can 13) which is used to suck liquids. As seen in FIG. 18, the pump 13 appears to be raised off the level of an adjacent floor such that liquid can flow into the pump.

U.S. Pat. No. 5,842,442 (Marr) discloses an animal treatment apparatus which includes a shallow trough for treating an animal, a container for containing water, a nozzle for aiming at the animal, and an electric pump for conveying water from the container to a spray head. A drain pipe drains the water from the trough back to the container.

U.S. Pat. No. 5,193,487 (Vogel) discloses a pet bathing apparatus that includes a tub having a water spray attachment. The tub has a drain portion which can be sealed with a plug. A drain screen is located in the drain to prevent hair from exiting the waste bath water. A hose for the water spray attachment is connected to an external water source.

U.S. Pat. No. 4,836,144 (Cole) discloses an apparatus and method for washing and disinfecting domestic pets which uses a container having a recirculating pump. A small volume of liquid is initially placed into the container. The container allows the water to drain toward the recirculating pump which has a wash hose connected thereto. The liquid continues to be recirculated through the hose until the pet has been cleaned. A recirculating pump is a pump having a small intake screen which filters and blocks debris washed into the container from being recirculated into hose.

U.S. Pat. No. 4,741,289 (Blose) discloses a portable dog shower where side and top spray grid members are removably attached to a shallow fiberglass base. A water inlet pipe and a drain pipe are included.

U.S. Pat. No. 1,879,915 (Smoot) discloses a portable animal bath which includes a shallow tub, a main spray tube and a hose connected to a water supply.

All references cited herein are incorporated herein by reference in their entireties.

BRIEF SUMMARY OF THE INVENTION

The present invention is directed to a power shampooer for pets which includes a submersible pump, a spray head, and a hose. The hose has a first end and a second end. The first end of the hose is sealingly connected to the spray head and the second end of the hose is sealingly connected to the pump. The submersible pump has a bottom with a pump inlet on the bottom. The pump may be placed on a generally flat surface and can pump liquid from the flat surface via the pump inlet through the hose and through the spray head.

In a preferred embodiment, the pump has spacers to raise the pump inlet off of the generally flat surface. Preferably, the pump inlet includes a plastic screen in combination with a stainless steel mesh screen to act as a filter to prevent clogging of the shampooer. Preferably the pump is adapted to provide between about 5 gallons and 25 gallons per minute (and more preferably, about 10 gallons per minute) when the pump is place about three feet below the spray nozzle.

BRIEF DESCRIPTION OF THE SEVERAL VIEWS OF THE DRAWINGS

The invention will be described in conjunction with the following drawing wherein:

FIG. 2 is a top view of a perforated plastic member as used in the power shampooer of FIG. 1.

FIG. 3 is a top view of a mesh screen as used in the power shampooer of FIG. 1.

FIG. 4 is a top view of a spacer plate as used in the power shampooer of FIG. 1.

DETAILED DESCRIPTION OF THE INVENTION

Figure 1:
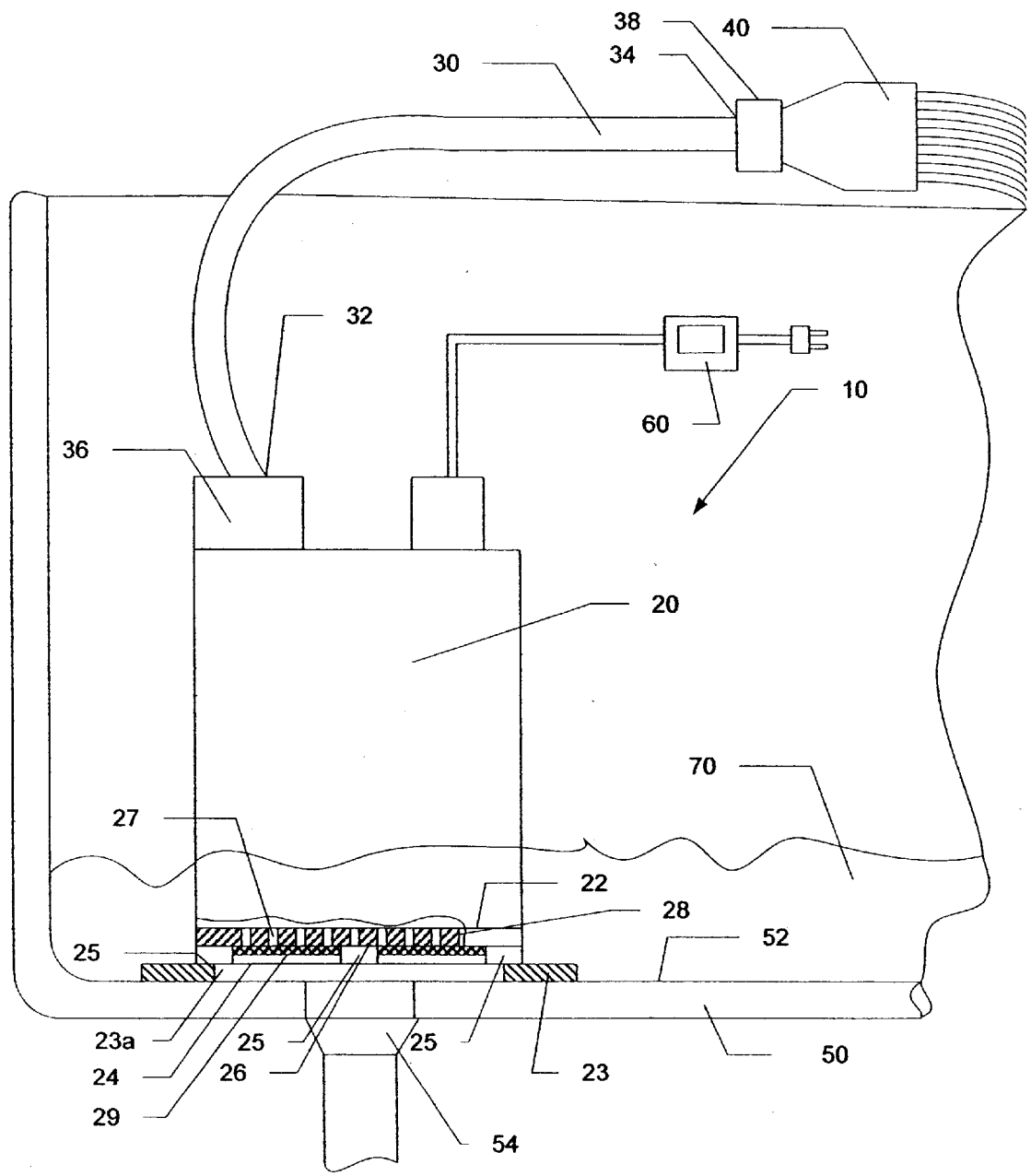
FIG. 1 is simplified front view of a power shampooer for pets, showing a submersible pump partially broken away, in accordance with one preferred embodiment of the present invention.

Referring now to the drawings, wherein like part numbers refer to like elements throughout the several views, there is shown in FIG. 1 a power shampooer for pets 10 in accordance with one preferred embodiment of the present invention.

For the purpose of the present invention, "shampooer" is intended to mean a washer using any typical powder, liquid or other type of cleaning agent (such as a detergent) or conditioning agent.

The basic elements of the power shampooer 10 are a submersible pump 20, a hose 30, and a spray head 40. Each will be described in further detail below. The power shampooer 10 is used in a tub 50 of an appropriate size wherein both the power shampooer and a pet, for example, a dog may be accommodated. The tub 50 preferably has a generally flat floor 52. As used herein, "generally flat" is meant to include all common tub floors which may be angled somewhat from the horizontal to facilitate flow of water 70 toward a drain 54.

The hose 30 has a first end 32 and a second end 34. The first end 32 of the hose 30 is sealingly secured to the pump 20 by, for example, a common threaded hose fitting 36, as is well known. The second end of the hose is also sealingly secured to the spray head 40 by, for example, a common threaded hose fitting 38. The hose must be of a flexible type to provide for free movement of the spray head 40 relative to the pump 20 (within the reach allowed by the hose 30). In the preferred embodiment, the hose 30 is of standard rubber or vinyl construction, is about six feet long, and has an internal diameter of about three-fourths of an inch.

The submersible pump 20 preferably has a generally flat bottom 22 which includes a pump inlet 24. The pump 20 is placed on the generally flat floor 52 of the tub 50, preferably adjacent to or over the drain 54. The drain 54 of such a tub 50 is typically located at a low point of the floor 52 of the tub 50 such that any water 70 that collects in the bottom of the tub 50 moves toward that low point. The pump inlet 24 includes a filter device 26 such that any solid material of a desired minimum size is trapped in the filter 26 such that clogging of the pump 20, hose 30 and spray head 40 is avoided.

In a particularly preferred embodiment, the filter 26 is a combination of a planar perforated plastic member 28 (that may typically be included in a purchased submersible pump) (see FIGS. 1 and 2) with a stainless steel mesh screen 29 (see FIGS. 1 and 3). This combination provides particularly beneficial filtering properties in light of the substantial amount of solid materials, for example, hair, dirt, flaking skin and the like, that may be washed off of a pet, such as a dog. The stainless steel mesh screen 29 is, for example, glued about its edges to the planar perforated plastic member 28 such that the combination of perforations 27 and apertures in the mesh screen 29 serve to allow water 70 to freely flow through the pump 20, but trap all solid materials greater than very small particles.

A particularly useful submersible pump 20 that may be used with the present invention is the Simer Model 2300. This pump 20 has several short legs 25 that are used to raise the level of the pump inlet 24 off the surface of the floor 52 of the tub 50. To accommodate the loss of height caused by the addition of the mesh screen 29, a spacer plate 23 (see FIGS. 1 and 4) is preferably used that attaches to the short legs 25. The spacer plate 23 has a large aperture 23a adjacent the pump inlet 24 to allow liquid to freely flow through the mesh screen 29 and perforated plastic member 28 into the pump inlet 24. The spacer plate 23 is attached to the legs of the pump 20 by, for example, screws (not shown).

The pump 20 preferably has a capacity to pump between about 5 gallons and 25 gallons per minute when the pump 20 is place about three feet below the spray nozzle 40. More preferably, the pump 20 has a capacity to pump between about 5 gallons and 25 gallons per minute when the pump 20 is place about three feet below the spray nozzle 40. The spray nozzle 40 may be a common shower head type spray nozzle.

The pump 20 is preferably controlled by an on-off switch 60 as is commonly available. Preferably, the on-off switch 60 is of a Ground Fault Circuit Interrupter type to provide appropriate safety.

In use, a pet, for example a medium sized dog, is placed in the tub 50. A stopper is placed in the drain 54 and the tub 50 is filled with about four gallons of water from, for example, a spigot. About one teaspoon of shampoo is added to the tub 50. A user moves the spray nozzle 40 in very close proximity to the skin of the dog in, for example, a back and forth or circular motion. The shampoo mixes with the four gallons of water 70 and a substantial amount of suds are formed. After several minutes, the drain 54 is unstopped allowing the four gallons of water 70 to drain out of the tub 50. The drain 54 of the tub 50 is stopped again and approximately 2 more gallons of fresh water is added to the tub 50. The dog is then rinsed in a like manner to the shampooing step above. The drain 54 is again unstopped and the operation is complete.

Advantages of the power shampooer for pets 10 of the present invention are numerous. The power shampooer 10 is highly efficient, eliminates hand scrubbing, conserves water and shampoo, saves time, and therefore saves money. The power shampooer easily gets under hair of the pet to remove dandruff and flaking, but, at the same time is very gentle, for example, on the pet's face.

Water and shampoo savings are substantial. For example, for a medium sized dog, the power shampooer 10 of the present invention utilizes only one teaspoon of shampoo and four gallons of water to wash and two additional gallons of water to rinse. Handwashing of a pet typically requires about six times that amount or about six teaspoons of shampoo for a medium size dog. Therefore, if a typical dog grooming business requires five gallons of shampoo per month, that same business would only require five gallons of shampoo per six months, resulting in a substantial savings.

Previously, a typical medium sized dog required twenty minutes for shampooing and rinsing. The power shampooer 10 can accomplish the same steps in less than five minutes. Since less shampoo is used, less rinse water is required. Since the time to wash the pet is less, substantially less water is typically used.

Additional benefits of the power shampooer 10 are that it is quiet and relatively maintenance free. The power shampooer is also effective at deskunking a pet.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. A power shampooer for pets, comprising:
   (a) a submersible pump;
   (b) a spray head;
   (c) a hose having a first end and a second end, said first end sealingly connected to said spray head and said second end sealingly connected to said pump; and
   (d) said submersible pump having a bottom and a pump inlet on said bottom, said pump adapted to be placed on a generally flat surface and adapted to pump liquid from the flat surface via said pump inlet through said hose and through said spray head, said pump inlet including a plastic screen in combination with a stainless steel mesh screen to act as a filter to prevent clogging of the shampooer.

2. The power shampooer of claim 1, wherein the pump has spacers to raise the pump inlet off of the generally flat surface.

3. The power shampooer of claim 1, wherein the pump is adapted to provide between about 5 gallons and 25 gallons per minute when the pump is place about three feet below the spray nozzle.

4. The power shampooer of claim 1, wherein the pump is adapted to provide between about 10 gallons per minute when the pump is place about three feet below the spray nozzle.

5. A power shampooer for pets, comprising:
(a) a submersible pump;
(b) a spray head;
(c) a hose having a first end and a second end, said first end sealingly connected to said spray head and said second end sealingly connected to said pump; and
(d) said submersible pump having a bottom and a pump inlet on said bottom, said pump adapted to be placed on a generally flat surface and adapted to pump liquid from the flat surface via said pump inlet through said hose and through said spray head, said pump inlet having a plastic screen in combination with a stainless steel mesh screen to act as a filter to prevent clogging of the shampooer, and wherein said pump includes spacers to raise the pump inlet off of the generally flat surface.

6. The power shampooer of claim 5, wherein the pump is adapted to provide between about 5 gallons and 25 gallons per minute when the pump is place about three feet below the spray nozzle.

7. The power shampooer of claim 5, wherein the pump is adapted to provide between about 10 gallons per minute when the pump is place about three feet below the spray nozzle.

* * * * *